Jan. 7, 1964 P. J. NIDER 3,116,654
DRILL

Filed May 15, 1961 2 Sheets-Sheet 1

INVENTOR.
PHILIP J. NIDER
BY
ATTORNEY

Jan. 7, 1964 P. J. NIDER 3,116,654
DRILL
Filed May 15, 1961 2 Sheets-Sheet 2

INVENTOR.
PHILIP J. NIDER
BY
ATTORNEY

United States Patent Office 3,116,654
Patented Jan. 7, 1964

3,116,654
DRILL
Philip J. Nider, 16120 Inglewood Ave., Lawndale, Calif.
Filed May 15, 1961, Ser. No. 109,921
7 Claims. (Cl. 77—67)

This invention pertains to a drill particularly adapted for forming holes in hard material.

While the need for a drill capable of use in connection with hard materials has long been felt, the requirement for such a tool is particularly critical at the present time. This is in view of the increased use of hard materials in the aircraft and missile fields. Hardened stainless steels and other alloys are finding wide application for such purposes. The fabrication of the aircraft, space vehicles, missiles and the like requires the drilling of large numbers of holes for fasteners and other purposes. This has been next to impossible with conventional techniques, because ordinary drills, even when themselves made of extremely hard materials, cannot cut the holes required in certain materials. Rapid breakdown from crushing and wear has rendered conventional drills unusable after only a brief period of time. Furthermore, even such holes as can be drilled by conventional means are quite inaccurate in size and the results are inconsistent.

The present invention provides a drill easily capable of forming a large number of openings through the hardest of materials with great accuracy in hole size, and without tendency toward crushing or undue wear. This is accomplished through the provision of a drill having negative angles of engagement with the work rather than positive angles as in the usual design. The drill tapers to the end surface where two webs extend radially outward from the center, each being scarfed off to provide a relief angle adjacent the cutting edge. As a result of this construction, the cutting edges are given improved support and cutting forces are absorbed through the major diameter as well as longitudinally of the drill, and not merely across the web as in conventional designs. This gives the drill a vastly superior ability to cut through hard materials. In addition, the drill can form holes in softer materials at greater feed rates than with conventional drills.

Therefore, it is an object of this invention to provide a drill capable of drilling through hard materials.

Another object of this invention is to provide a low cost, easily used means of providing accurate apertures through hard materials.

A further object of this invention is to provide a drill in which the cutting forces are absorbed through the portions of the drill of maximum strength.

An additional object of this invention is to provide a cutting tool having negative angles at the point of contact with the work.

These and other objects will become apparent from the following detailed description taken in connection with the accompanying drawing in which.

Figure 1:
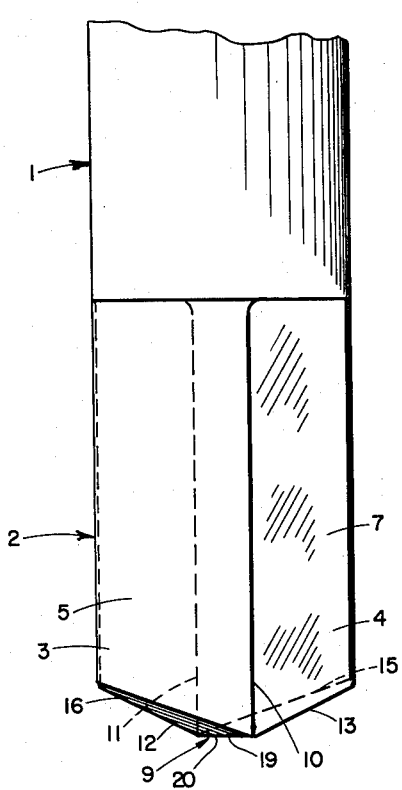
FIG. 1 is a front elevational view of the drill of this invention.
Figure 2:
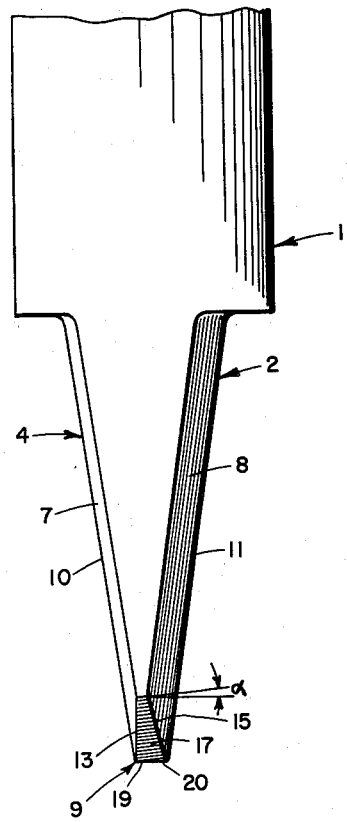
FIG. 2 is a side elevational view of the arrangement of FIG. 1.
Figure 3:
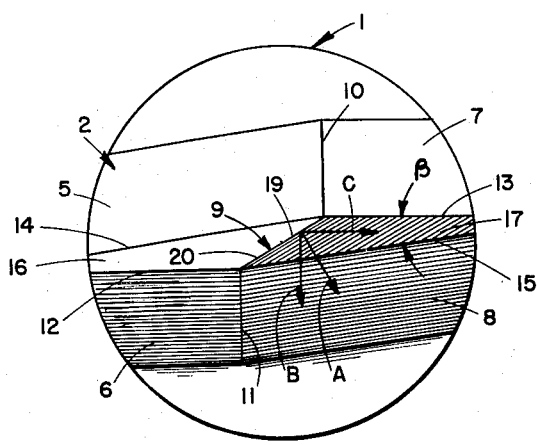
FIG. 3 is a bottom plan view of the drill.

As shown in FIGS. 1, 2 and 3 of the drawing, the drill of this invention includes a substantially cylindrical shank 1 from which projects a body portion 2. The latter section is formed from a duality of webs 3 and 4 the bases of which are relatively thick adjacent the shank. The webs are somewhat wedge-shaped in side elevation (see FIG. 2), tapering inwardly toward the end of the drill. Thus, surfaces 5 and 6 of web 3 converge toward the end of the drill, while corresponding surfaces 7 and 8 of web 4 likewise approach each other at the drill end.

Along the end of the drill the webs 3 and 4 join at an angularly positioned edge 9. Throughout the length of the webs, they connect along edges 10 and 11 which are in planes parallel to the axis of the drill. These longitudinal edges of the drill body are located on either side of the axis so that each web has a relatively narrow side connecting to the wider side of the adjacent web. The wider sides have roughly twice the dimension of the narrower sides.

As the drill is illustrated, it is designed for rotation in the counterclockwise direction. This provides the drill with rotationally forward parallel cutting edges 12 and 13. The end surfaces 16 and 17 of the webs 3 and 4 taper slightly to the rear of the cutting edges 12 and 13 so that there is a relief angle back of the cutting edges. This angle alpha will range normally from 3° to 15°.

The webs 3 and 4 likewise taper outwardly, as best seen in FIG. 3, so that the trailing edges 14 and 15 are parallel to each other but not to the edes 12 and 13. For maximum effectiveness it is important that the angles beta between the leading and trailing edges be held to proper values. Preferably this should fall within the range of 14° to 16°. Optimum results are realized at an angle of 15°.

There is in addition an inclination given to the end surfaces 16 and 17 of the drill so that the end of the drill is substantially V-shaped in front elevation as seen in FIG. 1. The amount of point given to the drill depends upon the thickness of the material to be drilled, and for deeper holes the drill end converges to a sharper tip than for more shallow openings.

As a result of the above-described construction, the drill of this invention includes not only the elongated parallel cutting edges 12 and 13, but additional cutting edges defined by the central angular edge portion 9. This edge forms two cutting surfaces in view of the fact that it is bisected by the axis of the drill. Thus as the drill rotates clockwise from the position shown in FIG. 3, the portion 19 to the upper right of the center of edge 9 engages one portion of the work while the portion 20 to the lower left of the axis contacts a diametrically opposite portion of the work within the hole being drilled. In all instances, the relief resulting from the chamfer given to end surfaces 16 and 17 assures that there is a clearance behind the cutting edge. Clearance for cutting edges 19 and 20 results also from the generally pointed end to the drill arising from the convergence of end surfaces 16 and 17.

This construction of the drill gives important advantages. At the point area of the drill as a hole is being cut, forces normal to the cutting edges 19 and 20 are encountered, such as force A illustrated diagrammatically in FIG. 3. Vectorially this load A may be resolved into components B and C directed across the web and radially along it. This means that not all of the force on the end of the drill, where the loads are high, is transmitted transversely across the thickness of the web. Instead, a large component of this force is directed radially outward along the web. This force component, therefore, is borne by the major diameter of the drill and not merely by a relatively thin flute or web section as in conventional designs. This makes the drill vastly more resistant to the loads imposed upon it and removes any tendency for the drill to crush at the cutting edges.

A further advantage is realized from the outwardly convergent nature of the side walls of the webs of the drill.

The fact that surfaces 5, 6, 7 and 8 give the drill its wedge-shaped configuration means that there is a negative angle of engagement along the cutting edges of the drill. In other words, rather than being undercut at the cutting edges as in the usual drill construction, the sides of the drill diverge outwardly away from the end surfaces of the drill. This provides an included angle of greater than 90° at the cutting edge, and gives a much greater support beneath the cutting edges so that they can withstand high loads in cutting into the hardest of materials without deterioration. This negative angle also permits some of the force imposed upon the cutting edge of the drill to be absorbed in an axial direction where the drill is of maximum strength. A negative angle also is presented at the inner cutting edges 19 and 20 because of the relative angularity of the end surfaces 16 and 17. Hence, all of the cutting edges are fully supported and are not undercut.

In addition, the fact that the webs extend the full width of the drill adds to the wear resistance it offers. Hence the drill not only will not break down during the forming of the holes in the workpiece, but also drills holes of greater accuracy without taper and with more consistent results. The drill also is capable of cutting through much greater thicknesses than in ordinary constructions.

Figure 4:
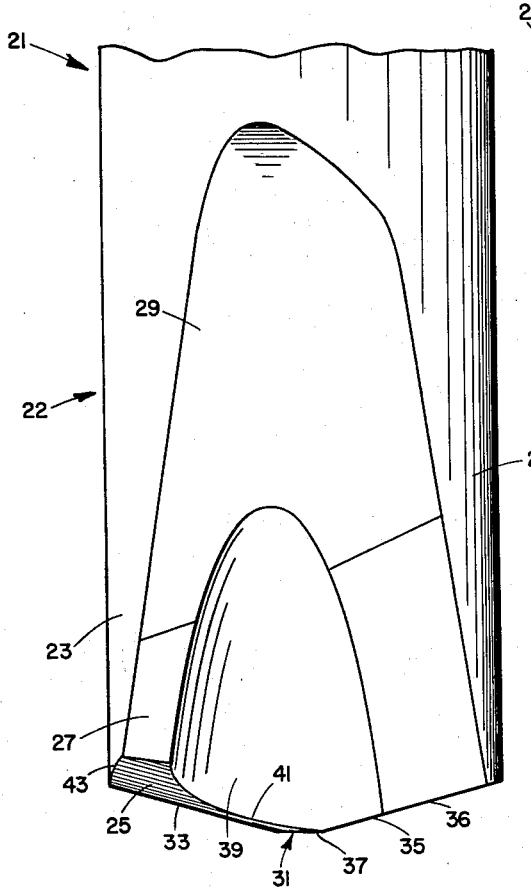
FIG. 4 is a front elevational view of a modified form of the drill of this invention.
Figure 5:
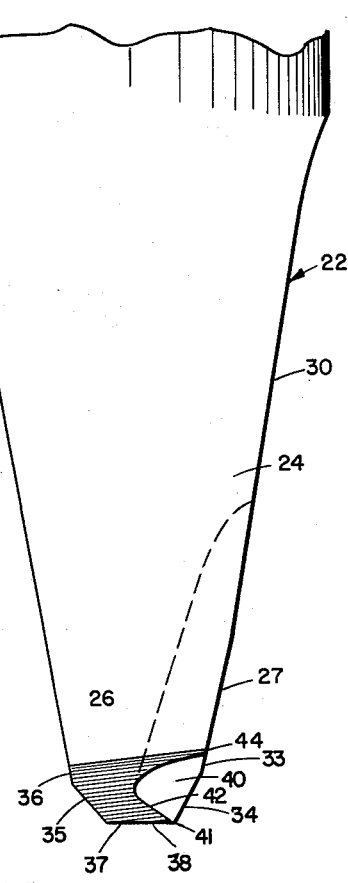
FIG. 5 is a side elevational view of the design of FIG. 4.
Figure 6:
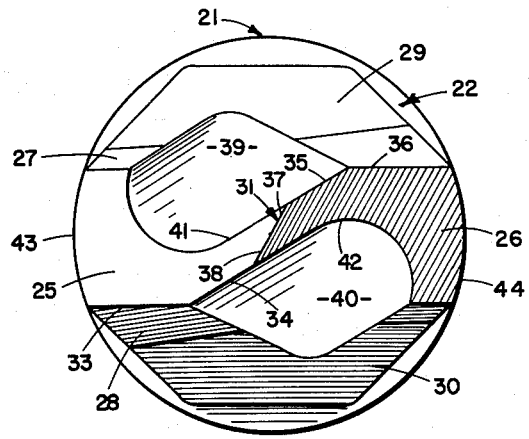
FIG. 6 is a bottom plan view of the modified drill.

A modification of the drill construction may be seen by reference to FIGURES 4, 5 and 6 which illustrate a drill having particularly great rigidity. This embodiment of the drill may be used to advantage on steels of high nickel or chromium content. This form of the drill includes a shank portion 21 leading to the body portion 22 that includes webs 23 and 24. These webs taper outwardly to the end surfaces 25 and 26 of the drill. Added strength and rigidity are given the drill by inclining the outer side portions 27 and 28 more sharply toward the axis of the drill than the inner side portions 29 and 30. This permits the drill to maintain a maximum thickness for a major portion of its length.

The end surfaces 25 and 26 interconnect along a central angular edge portion 31. Surfaces 25 and 26 are chamfered away from the cutting edges to provide a relief as in the previous design. Thus the web 23 includes forward cutting edges 33 and 34, while corresponding cutting edges 35 and 36 are defined by the other web 24. Edges 34 and 35 are parallel as are cutting edges 33 and 36. Additional cutting surfaces are provided by the two edge sections 37 and 38 on either side of the axis.

Relatively short recesses 39 and 40 are included in the sides of the webs for defining the forward cutting edges 34 and 35, as well as trailing edges 41 and 42 of the webs. The recesses 39 and 40 extend only a portion of the width of the webs so that there remain outer thickened portions 43 and 44 of the webs which gives this embodiment of the drill considerable added strength at such areas.

As in the previous described embodiment, this version of the drill provides negative angles of contact for the cutting edges and causes the forces to be taken out through the strongest portions of the drill. The fact that the sides 27 and 28 as well as the recesses 39 and 40 flare outwardly from the end surfaces of the drill means that the cutting edges are fully supported and are highly resistant to crushing loads. It also results in force components axially of the drill so that the forces are transmitted to areas of maximum strength. Furthermore, the forces on the cutting edges 34 and 35 as well as edges 37 and 38 provide components extending radially outwardly along the length of each web rather than all across a thin web portion. The loads on the outermost cutting edges 33 and 36 pass directly into the thickened portions 43 and 44 of the web. These are of great strength and can readily withstand forces across the web at that location. Furthermore, these enlarged web portions at the outer edges give the drill added rigidity and wear resistance at its periphery.

From the foregoing it is apparent that I have provided an improved drill design departing significantly from conventional structures through the provision of the negative angles at the cutting edges and the arrangement for absorbing the forces in the most advantageous manner. This construction permits drilling without difficulty through materials having a hardness of 72 on the Rockwell C scale. Holes to a depth of ten times the drill diameter can be formed instead of the usual limitation of four times diameter. Normally carbide is used as the material for the drill of this invention, but a considerable saving may be realized by utilizing an extruded grade of material. More expensive sintered carbide has been necessary in prior designs.

The foregoing detailed description is to be clearly understood as given by way of illustration and example only, the spirit and scope of this invention being limited solely by the appended claims.

I claim:
1. A drill comprising a duality of webs rotatable about an axis, said webs being interconnected along an edge intersecting said axis, each of said webs including a leading edge, said leading edges being connected to opposite ends of said intersecting edge, each web having a trailing edge the inner end of which is connected to the inner end of the leading edge of the other web, the end surface of each of said webs being inclined inwardly from said leading edge to said trailing edge thereof, each of said webs including a cylindrical surface substantially parallel to and concentric with said axis, said end surfaces extending to and interconnecting with said cylindrical surfaces, said cylindrical surfaces diverging axially inwardly of said end surfaces.

2. A device as recited in claim 1 in which the leading edges of said webs are parallel to each other, and the trailing edges of said webs are parallel to each other.

3. A device as recited in claim 1 in which said leading and trailing edges of each of said webs are outwardly convergent.

4. A device as recited in claim 3 in which the angle between said leading and trailing edges is from about 14° to about 16°.

5. A device as recited in claim 3 in which the angle between said leading and trailing edges is approximately 15°.

6. A drill comprising a cylindrical shank, a web means extending outwardly from said shank, said web means including outwardly convergent side portions terminating in a duality of end surfaces, each of said end surfaces having a cutting edge extending inwardly from the periphery of the web to a point spaced from the axis of said shank on one side thereof and being inclined inwardly away from said end cutting edge, said cutting edges being substantially parallel, said end surfaces being interconnected along an edge extending between the inner ends of said cutting edges at an angle with respect thereto, said interconnecting edge thereby defining additional cutting edge surfaces along either side of the axis thereof, said web means including outwardly convergent cylindrical surfaces forming a continuation of said shank and extending to said edge surfaces and connecting thereto.

7. A drill comprising a cylindrical shank, a duality of webs extending outwardly from said shank, each of said webs having side portions converging outwardly and terminating in an end surface, one of said sides extending for less than the distance between the radial outer edge of said web and the axis of said shank, and the other of said sides extending for more than said distance, each of said end surfaces being chamfered inwardly from said relatively shorter side to said relatively longer side for defining a cutting edge between said end surface and said shorter side, said webs being interconnected at their inner portions such that the shorter side of one of said webs joins the longer side of the other of said webs and said end surfaces are interconnected at an angularly extending edge extending between the inner terminus of said cutting edge of each of said webs, said angular edge intersecting the axis of said shank and thereby providing an additional cutting edge on either side of said axis, each of said webs having a substantially straight cylindrical surface forming a continuation of said shank, said cylindrical surfaces being outwardly convergent toward the end surface of the web with which it is associated and connecting to the end surface thereof.

References Cited in the file of this patent

UNITED STATES PATENTS

| | | |
|---|---|---|
| 2,889,725 | Turton et al. | June 9, 1959 |
| 2,936,658 | Riley | May 17, 1960 |